(No Model.)

H. STANGE.
ROTARY DOUBLE BEARING WITH PERIODICALLY ALTERNATE ACTION.

No. 305,351. Patented Sept. 16, 1884.

Witnesses:
Robert Kirk

Inventor:
Hermann Stange

UNITED STATES PATENT OFFICE.

HERRMANN STANGE, OF DRESDEN, SAXONY, GERMANY.

ROTARY DOUBLE BEARING WITH PERIODICALLY ALTERNATE ACTION.

SPECIFICATION forming part of Letters Patent No. 305,351, dated September 16, 1884.

Application filed May 9, 1884. (No model.)

*To all whom it may concern:*

Be it known that I, HERRMANN STANGE, of the city of Dresden, in the Kingdom of Saxony, and German Empire, have invented certain new and useful Improvements in Rotary Double Bearings with Periodically Alternate Action, of which the following is a specification.

This invention relates to improvements in rotary double bearings with periodically alternate action, which are admirably adapted for employment in weighing-machines or other scientific or industrial measuring apparatus. The chief novelty consists in the arrangement of a bearing with free motion in the one part, and whereby both parts act alternately—that is to say, while the one bearing is in action the other remains inactive, and vice versa—and whereby the outer bearing receives its rotary motion from the inner bearing by means of the free movement of the inner bearing in the outer by the dislocation of the center of gravity.

Figure 1:
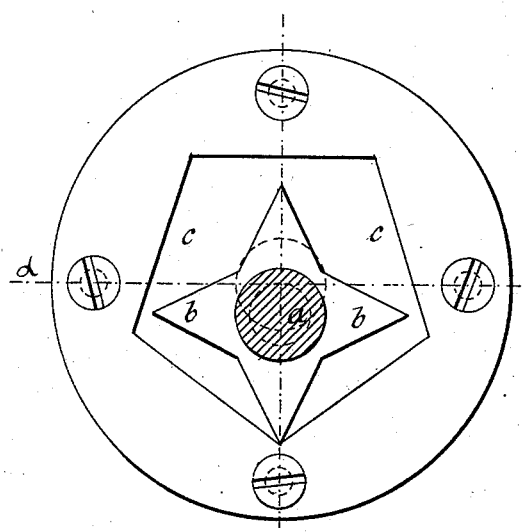
Figure 3:
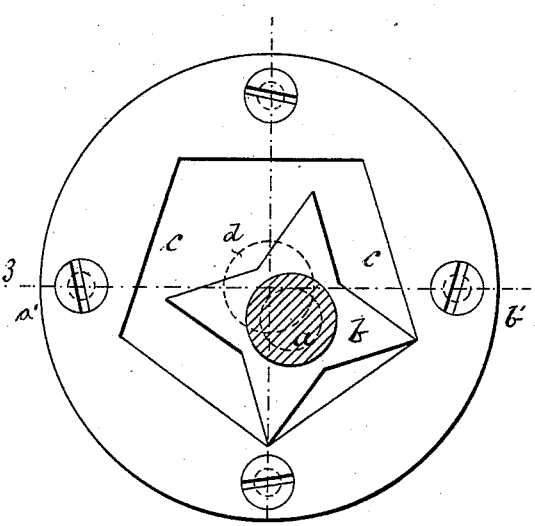
Figure 2:
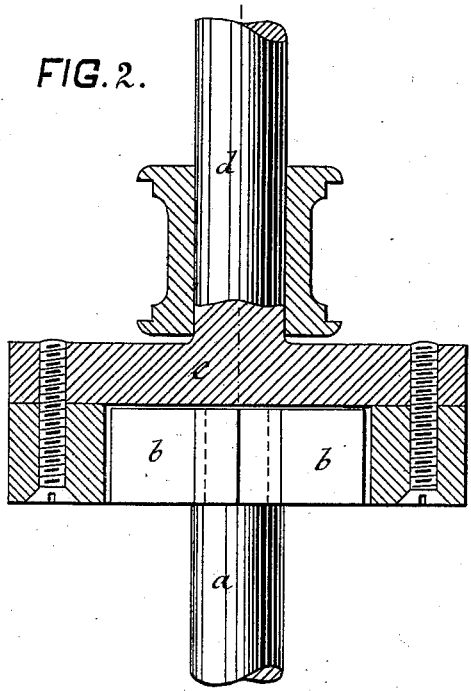
Figure 4:
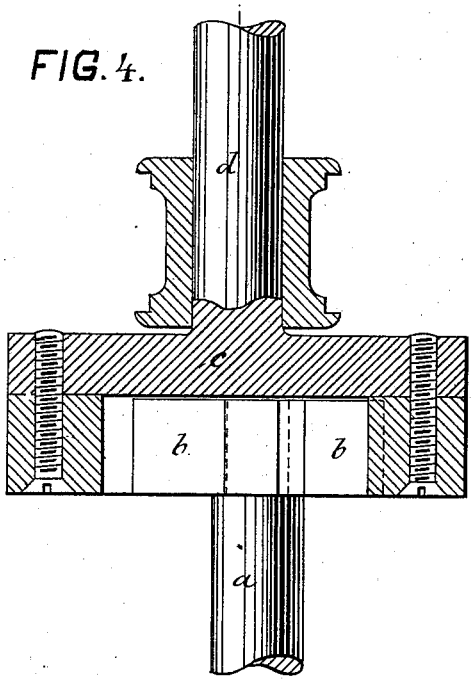

Figure 1 is an elevation showing the inner bearing in a vertical position in the outer bearing. Fig. 2 is a section on the line $\alpha$ $\beta$ in Fig. 1. Fig. 3 is an elevation showing the inner bearing, $b$, moved to the right, so that a second point of the same comes in contact with the inner surface of the ring screwed to the outer bearing. Fig. 4 is a section on the line V S in Fig. 3.

The star-like bearing $b$, with four arms, is fixed on the shaft $a$, and arranged in the hollow bearing $c$. The interior surface consists of a pentagon or more sided polygon, with sides of equal size. The size of the inner bearing, $c$, is so chosen that the axis $a$ lies beneath the axis $d$ of the polygonal bearing $c$ in such manner that two adjacent points or knife-edges of the star-formed bearing $b$ continuously gear into two corners of the polygonal bearing $c$. If the bearing $b$ stands in the position shown in Fig. 1, the same can be moved without moving the bearing $c$. This free movement can be employed as bearing for the weighing-beam in rotary weighing-machines in order to attain an exact and frictionless weighing. The burden carried by the bearing $b$ produces in the position shown in Fig. 1 pressure on the axle of the bearings $c$ alone. If the bearing $b$ is now moved to the one or the other side, the next knife-edge will press on the corresponding corner $f$, the polygon and the center of gravity moved to the side of the axis of the bearing $c$, lateral pressure applied to the same, and consequently a rotation of the said bearing $c$ produced, Fig. 2. This movement ceases in the moment when the axis $a$ attains a like position to the axis $d$, whereupon the movement described above is repeated. The exterior form of the bearing $c$ is round, and the same can be arranged in suitable bearings; but, in order to avoid excessive friction, the axis $d$ is arranged in the center of the bearing.

What I claim as my invention is—

The double bearing consisting of the star-formed bearing $b$ and the polygon $c$, whereby the inner bearing, $b$, bears frictionless by means of one of its knife-edges in a corresponding corner or junction of two sides of the polygonal, and whereby this free bearing produces a periodical alteration in the position of the axis $a$ to the axis $d$, in order to produce a limited rotation of the outer layer by the dislocation of the center of gravity, substantially as described.

In witness whereof I have hereunto signed my name in the presence of two subscribing witnesses.

HERRMANN STANGE.

Witnesses:
OTTO WOLFF,
ARTHUR WILLIAM VOIGT.